United States Patent
Jaroch

(10) Patent No.: US 11,120,338 B2
(45) Date of Patent: Sep. 14, 2021

(54) GENETIC GENERATION OF TOOLS FOR CONVOLUTIONAL NEURAL NETWORK

(71) Applicant: Colossio, Inc., Chicago, IL (US)

(72) Inventor: Joseph A. Jaroch, Chicago, IL (US)

(73) Assignee: Colossio, Inc., Chicago, IL (US)

( * ) Notice: Subject to any disclaimer, the term of this patent is extended or adjusted under 35 U.S.C. 154(b) by 909 days.

(21) Appl. No.: 15/817,539

(22) Filed: Nov. 20, 2017

(65) Prior Publication Data

US 2019/0156217 A1    May 23, 2019

(51) Int. Cl.
| | |
|---|---|
| *G06N 3/08* | (2006.01) |
| *G06F 9/30* | (2018.01) |
| *G06N 3/12* | (2006.01) |

(52) U.S. Cl.
CPC ........... *G06N 3/12* (2013.01); *G06F 9/30003* (2013.01); *G06N 3/08* (2013.01)

(58) Field of Classification Search
CPC ........ G06N 3/12; G06N 3/08; G06F 9/30003; G06F 9/30
See application file for complete search history.

(56) References Cited

U.S. PATENT DOCUMENTS 8,010,471 B2 * 8/2011 Zhang ................ G06K 9/00288
706/45

2014/0185925 A1 * 7/2014 Datta ................... G06K 9/6256
382/159
2016/0358070 A1 * 12/2016 Brothers ............... G06N 3/0454
2017/0102940 A1 * 4/2017 Henry .................. G06F 9/30101

OTHER PUBLICATIONS

K. Lillywhite, D.-J. Lee, B. Tippetts, J. Archibald A feature construction method for general object recognition Pattern Recognition, 46 (2013), pp. 3300-3314 (Year: 2013).*
E.P. Ijjina, K.M. Chalavadi, Human action recognition using genetic algorithms and convolutional neural networks, Pattern Recognition (2016), pp. 1-14 (Year: 2016).*

* cited by examiner

*Primary Examiner* — Hal Schnee
(74) *Attorney, Agent, or Firm* — Barnes & Thornburg LLP

(57) ABSTRACT

Methods for genetic generation of tools for use in a convolutional neural network are provided. Randomly generated starting points and sets of positive and negative tasks are distributed to multiple processors. Each processor iterates an instruction queue over its received tasks based on existing analysis tools, generating a test score for each iteration. A set of instructions is saved as a new tool if its generated test score determines a successful test. A convolutional neural network is executed over complex test cases based on a tool set that includes the new tools. Output results of the convolutional neural network are analyzed and a new tool set is created by removing tools that are not utilized in generating the output results. Systems and machine-readable media are also provided.

20 Claims, 6 Drawing Sheets

GENETIC GENERATION OF TOOLS FOR CONVOLUTIONAL NEURAL NETWORK

TECHNICAL FIELD

The present disclosure generally relates to neural networks, and more specifically relates to a system for providing a genetic convolutional neural network layer to generate and weight image and data analysis tools without human bias.

BACKGROUND

Artificial intelligence has made significant strides in recent years due to the advent of convolutional neural networks. These tools have proven to be exceptionally capable at categorizing images when trained using sufficiently large datasets. However, their categorization strengths have plateaued to some extent, and while they are flexible enough to tackle different sorts of problems, they still require domain expertise to tune, which allows preconceived notions to find their way into the design and potentially limiting the effectiveness of the neural network.

It is desired to provide a new neural network layer to generate and assign weights to image analysis tools without human bias, which may then be used for neural network processing.

The description provided in the background section should not be assumed to be prior art merely because it is mentioned in or associated with the background section. The background section may include information that describes one or more aspects of the subject technology.

SUMMARY

According to certain aspects of the present disclosure, a computer-implemented method for genetic generation of a tool for a convolutional neural network is provided. In one or more embodiments, the method includes receiving a set of positive and negative tasks, generating a plurality of random starting points and distributing the received tasks and the generated starting points to a plurality of processors. The method also includes, at each of the plurality of processors, using a received starting point as a random seed, incrementing the received starting point, initializing a size of an instruction queue, generating an instruction operator from a set of existing tools and generating a random instruction operand. The method further includes, at each of the plurality of processors, adding the generated instruction operator and random instruction operand to a list of instructions, determining if the instruction queue has been filled, executing the instruction queue if the instruction queue has been filled, generating a score for an executed list of instructions in the instruction queue and saving the executed list of instructions as a new tool if the score is determined to be acceptable.

According to certain aspects of the present disclosure, a system for genetic generation of a tool for a convolutional neural network is provided. The system includes a memory and a processor configured to execute instructions. The executed instructions cause the processor to receive a random starting point and a set of positive and negative tasks; use a first starting point as a random seed; increment the first starting point to obtain a second starting point; one of initialize and increment a size of an instruction queue; generate an instruction operator from a set of existing tools and a random instruction operand; add the generated instruction operator and random instruction operand to a list of instructions; execute the instruction queue if the instruction queue has been filled; generate a score for an executed list of instructions in the instruction queue, wherein the generated score is a final score based on success and failure over the set of positive and negative tasks; and save the executed list of instructions as a new built tool if the score is determined to indicate one of a successful test and a test more successful than a previous test.

According to certain aspects of the present disclosure, a non-transitory machine-readable storage medium comprising machine-readable instructions for causing a processor to execute a method for genetic generation of a tool set for a convolutional neural network is provided. The method includes receiving a set of positive and negative tasks; generating a plurality of random starting points; distributing the received tasks and the generated starting points to a plurality of processors; using a received starting point as a random seed; incrementing the received starting point; initializing a size of an instruction queue; generating an instruction operator from a set of existing tools; generating a random instruction operand; adding the generated instruction operator and random instruction operand to a list of instructions; determining if the instruction queue has been filled; executing the instruction queue if the instruction queue has been filled; generating a score for an executed list of instructions in the instruction queue; and saving the executed list of instructions as a new tool if the score exceeds a success threshold.

It is understood that other configurations of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
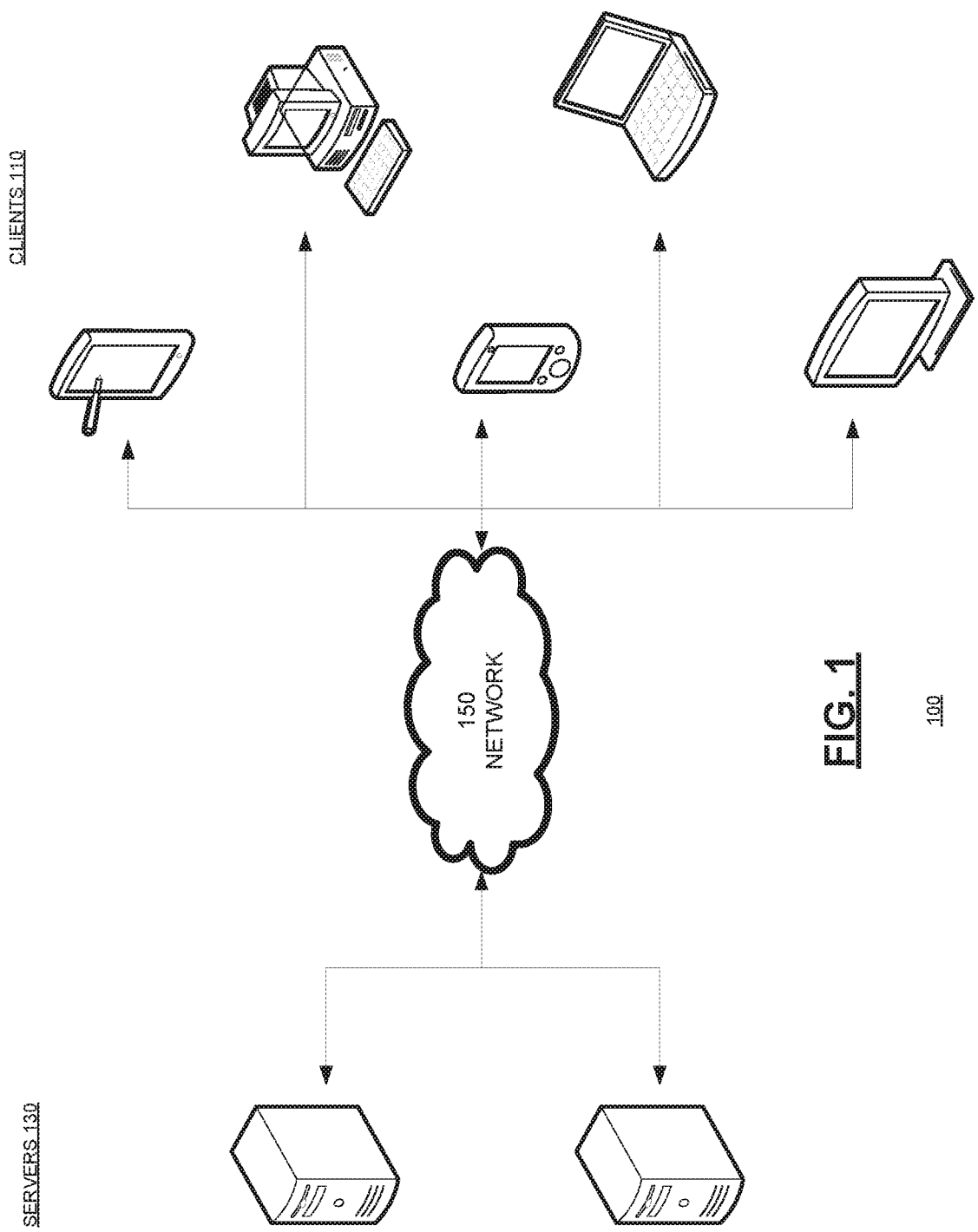
FIG. 1 illustrates an example architecture for providing a genetic convolutional neural network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

In a conventional convolutional neural network, a series of well-known functions are provided and the network permutates (e.g., convolutes) a given image or block of data using each of the functions. The neural network then evaluates if the outcome of the convolutions results in the data being classified accurately based on a pre-chosen dataset and expected answer.

If the network does not properly score the data, it back propagates a correction through the network, adjusting the weighting of each of the convolution functions until the correct outcome is received. For example, a Function A may be given a 10% weight to the final score and a Function B may be given a 20% weight, adjusted down from 15% and 25% from a previous iteration.

This works well for many problems as the exact weights and importance of each of the convolutions doesn't need to be known beforehand and the system can tune each convolution to produce the required output. However, this type of system or process does not account for the nature of the convolutions themselves.

In particular, a common network will include convolutions like image transformations (e.g., flipping, changing colors), translations (e.g., skewing, inverting), finding edges (e.g., identifying contours, gradient inspections), and a number of other well-known operations that convolute the full image or a part of the image. But, because these algorithms need to be pre-chosen and pre-determined (e.g., by human experts with inherent human biases), there is often a limitation in output effectiveness relative to if a different type of algorithm were used at the convolutional layer.

Thus, in one or more embodiments, the disclosed system removes any manual work (e.g., biased human input) within the preparation of convolutional network functions. Instead, the disclosed system provides a completely new neural network layer using initial, computationally intensive genetic algorithms for generating tools that are used by later levels of processing.

These tools may be generated by brute force and built automatically with training sets. For example, similar to biology, these tools may be given only a few very basic instructions to work with and the genetic algorithms continuously build more complex tools on top of these instructions.

The primary instructions (e.g., the initial set of tools) may include modulus, multiplication, division, addition, subtraction, binary shifting, and the use of registers/memory for building more complex operations. The genetic layer may be given an array of positive and an array of negative input. The genetic layer may then build a string of commands using the above primary instructions that satisfy the positive and negative input conditions.

For example, if the genetic layer is looking to produce a function which identifies numbers which are multiples of 17, the genetic layer may generate sixteen "add 1" calls to a register and then check if the input modulus of the register equals zero. Once the "identify multiples of 17" tool is built by the genetic layer, the tool may be introduced into an overall set of tools to be used in future iterations. Thus, if another challenge is posted to identify a number which is a multiple of 34, the genetic convolutional neural network may build a script which would identify if the number "divided by two" is a "multiple of 17," based on the execution of the "multiple of 17" tool.

Numbers represent a simple and concrete case, but the genetic layer may be expanded to more complex data like images. For example, an initial training set may be prepared that allows the genetic algorithm to identify images of a certain color, thus generating a color identification tool. Then, the genetic layer may use the color identification tool alongside other generated operations (e.g., other genetically generated tools) to identify more complex features of images, such as shape (e.g., a rectangle, a circle, etc.). Again, this code (e.g., combination of tools) is written automatically without needing to specifically use known algorithms such as edge detection routines, for example. However, edge detection algorithms (e.g., edge detection tools) may be produced automatically by the genetic layer, confirming that the known edge detection tools are part of the best solution for identifying an image shape.

There is a delineation between problems which can be solved deterministically and ones that require more complex layering. The genetic tool building approach will not be able to solve every problem deterministically in a short enough computation time, so subsets of the "perfect" tool may be used as the input functions within a convolutional neural network. This secondary layer may provide an approximate, yet very accurate, classification of complex datasets and images, again without preconceived notions provided by humans of what types of permutations would be most effective for a given type of input.

The new genetic layer allows for broader applicability of neural networks to atypical data sources. For example, rather than having to write code that analyzes music and breaks the music into some constituent components, the genetic algorithm may brute force generate a large number of different tools, which when used as input functions in a convolutional neural network, are able to carve apart the input data granularly enough to classify it.

In real-world use for classifying images, several thousand discrete tools may be generated, which when used within a convolutional neural network, results in extremely high dimensional output. This may require significant computational resources and parallelization initially. However, the results of being agnostic to input types and avoiding the need for hand-rolling the convolutions (e.g., human selection of known convolutions) ensures cleaner output and a more portable neural network to new datatypes. Thus, in one or more aspects, the system improves the accuracy of machine learning classification and provides for convolutional neural networks to be applied to a wider range of data sources by removing the manual configuration steps of developing discrete convolutions.

For example, a training set of increasing complexity may be prepared manually or through other machine learning approaches. This training set represents the initial basic process and is common across all further applications of the same data type (i.e., for all images or all text). Thus, the resultant generated tools do not need to be re-generated for subsequent applications.

This training set may increase in complexity and may include positive and negative examples for each category. For example, in the case of images an effective training set may include:
- distinguishing between on and off pixels (e.g., black vs white)
- distinguishing between colors (e.g., a group of red vs a group of blue)
- distinguishing between shades of colors (e.g., a group of red and darker red, vs a group of blue and darker blue)
- identifying simple shapes (e.g., a variety of rectangles vs a variety of circles)
- identifying shape plus color (e.g., a variety of rectangles in various colors vs a variety of circles in various colors)

The genetic convolutional neural network may then begin to classify the datasets. The genetic network may start by reading all of the positive or negative pieces of data (e.g., image, word, files, etc.) and then spawn off a large number of parallel processes. Each parallel process may begin at a different starting region to search for a solution. Depending on the task, processes may be spawned by generating a random number and using the generated random number as a seed for future iterations.

Each spawned process may iterate via brute force over the sample set. The spawned process may choose each subsequent instruction and the parameters for each instruction, concatenating instructions to the current instruction list. Here, the initial set of instructions may include simple mathematical operations, such as modulus, multiplication, division, addition, subtraction, binary shifting and the use of registers/memory for building more complex operations. The end result of the execution of instructions may be a floating point in the range of 0-1, which indicates the precision of the match. For deterministic results, the answer will be exactly 0 or 1. For more complex cases where ambiguity is possible, the result will be a floating point. Thus, the instruction list may resemble assembly code.

For example, an instruction list for determining if the input number is a multiple of three may consist of:
add register 1
add register 1
add register 1
input modulus register
add result 1

In this example, the register will be incremented until it equals 3, then the input value (e.g., 4) will execute "input mod 3" which equals '1.' Adding '1' to the result causes the final returned value to be '2,' which indicates "False" as it is not equal to '1' and indicates that the input is not a multiple of three. An input of '6' would execute "input mod 3," which equals '0,' and adding '1' results in '1,' which indicates "True" as '6' is a multiple of '3.'

The genetic layer may continue increasing the length of the instruction list until it finds a match. Each time that the instruction list fills, the genetic layer may execute the list over the sample set and determine the accuracy of the assessment, such as seeing how many positive entries are classified accurately and minimizing the number of false classifications from the negative list. Once a given instruction list is found that satisfies all of the positive and negative constraints, all of the parallel processes may then be stopped and that instruction list may then be saved as a tool to be used on future executions. The system may then continue to the next phase of analyzing more complex problems, using this saved tool alongside other standard input instructions.

Once tools have been generated to classify the entire training set to the highest feasible degree of accuracy, the tools may be used as input functions to a standard convolutional neural network alongside more conventional functions (e.g., simple translations, edge finding, etc.). The neural network may then be executed as normal to classify more complex objects.

Neural network weights may be used to further refine which tools are used. For example, if some tools are not contributing to the final output, those non-contributing tools may be removed to improve the efficiency of the system. Also, a set of tools may be saved, packaged and distributed in a pre-built group to avoid needing to have an external recipient perform heavyweight processing if the set of tools matches their general use cases.

Example System Architecture

Architecturally, the representative technology can be deployed anywhere. For example, it may be preferable to operate on a server with a significant amount of computing power due to the computation that needs to occur to build and process the genetic convolutional tool sets.

In one or more embodiments, the system may be deployed on a very powerful server, in particular one with parallel processing capabilities. Graphics cards may be used as optimizations for processing more operations in parallel. In one or more aspects, the generated workload may be optimally distributed across multiple different physical computers.

FIG. 1 illustrates an example architecture 100 for generating genetic convolutional tool sets without human intervention. The architecture 100 includes servers 130 and clients 110 connected over a network 150.

The clients 110 can be, for example, desktop computers, mobile computers, tablet computers (e.g., including e-book readers), mobile devices (e.g., a smartphone or personal digital assistant), set top boxes (e.g., for a television), video game consoles, or any other devices having appropriate processor, memory, and communications capabilities for utilizing neural network tool sets for analyzing data. The system queries tool sets on the client 110 or over the network 150 from one of the servers 130 to analyze particular data of interest (e.g., an image).

One or more of the many servers 130 are configured to utilize a genetic layer to generate tools by brute force iterations using training sets and store the generated tools in a genetic convolutional tool database. The database may include, for each tool in the database, information on the relevance or weight of the tool with regards to the selected data to be analyzed on the client 110. The tool database on the servers 130 can be queried by clients 110 over the network 150. For purposes of load balancing, multiple servers 130 can host the tool database either individually or in portions.

The servers 130 can be any device having an appropriate processor, memory, and communications capability for hosting a neural network layer and tools. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Non-Linguistic Content Analysis

Figure 2:
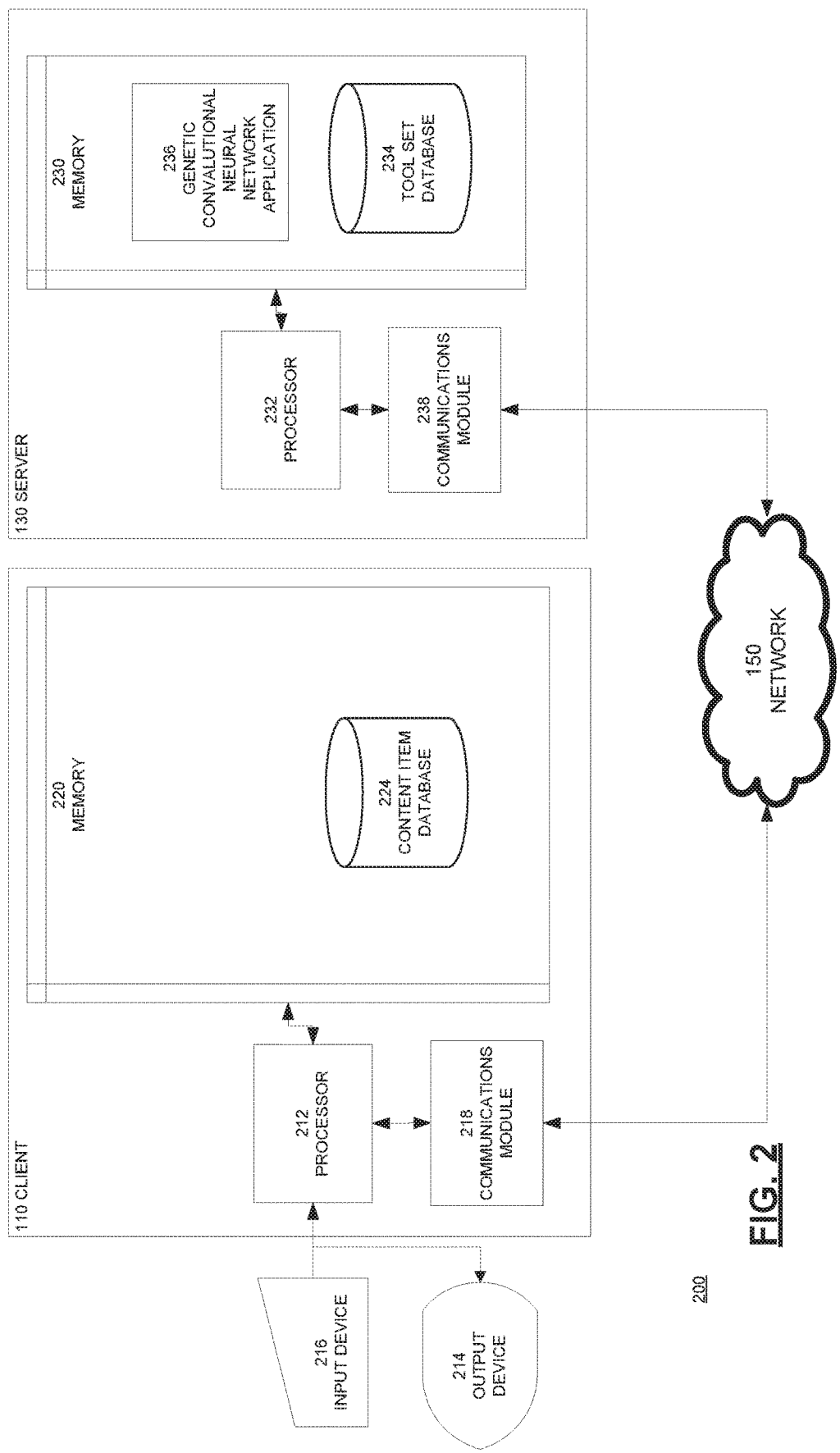
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure.

The client 110 and the server 130 are connected over the network 150 via respective communications modules 218 and 238. The communications modules 218 and 238 are configured to interface with the network 150 to send and receive information, such as data, requests, responses, tools and commands to other devices on the network. The communications modules 218 and 238 can be, for example, modems or Ethernet cards. The client 110 also includes an input device 216, such as a stylus, touchscreen, keyboard, or mouse, and an output device 214, such as a display. The server 130 includes a processor 232, the communications module 238, and a memory 230. The memory 230 includes a tool set database 234 and a genetic convolutional neural network application 236.

The client 110 further includes a processor 212, the communications module 218, and a memory 220. The memory 220 includes a content item database 224. The content item database 224 may include, for example, a document such as a text document, a spreadsheet, a media file (e.g., audio, image, video, or any combination thereof), or any other data object/body of data configured to be interacted with by a user of the client 110. The content item database 224 may also include passive content items that are not inherently interactive, such as text, photographs, graphic images, emoji's, etc. The client 110 may be configured to analyze a content item from the content item database 224, such as determining a selection of the content item, querying the tool set database 234 on the server 130 for tools relevant to the selected content item, and analyzing the selected content item using the relevant genetic convolutional neural network tools obtained from the server 130.

The processors 212, 232 of the client 110, server 130 are configured to execute instructions, such as instructions physically coded into the processor 212, 232 instructions received from software in memory 220, 230 or a combination of both. For example, the processor 212 of the client 110 may execute instructions to select a content item from the content item database 224, to generate a query to the server 130 tool set database 234 for convolutional tools relevant for analysis of the selected content item, to analyze the selected content item using the relevant convolutional tools and to provide the results of the analysis for display on the client 110. The processor 232 of the server 130 may execute instructions to generate genetic convolutional neural network tools, to store the generated tools in the tool set database 234, to search tool set database 234 for tools most relevant to the selected content item, and to provide the most relevant tools to the client 110. The client 110 is configured to access the tool set database 234 on the server 130 over the network 150 using the respective communications modules 218 and 238 of the client 110 and server 130.

Specifically, the processor 212 of the client 110 executes instructions causing the processor 212 to receive user input (e.g., using the input device 216) to determine selection of a content item/body of data within the content item database 224. For example, the user may select a text document or an image.

The processor 212 of the client 110 may also execute instructions causing the processor 212 to generate a query for neural network tools related to the selected content and to display the relevant results of the search/query. For example, a researcher attempting to improve the efficacy of certain face recognition algorithms user may interface with the server 130 through the client 110 to invoke the genetic convolutional neural network application 236. Here, the processor 212 may generate a query to the genetic convolutional neural network application 236 for generating new tools and/or tool sets related to face recognition.

The processor 232 of the server 130 may receive from the researcher an example set of a number of simple pattern matching tasks, increasing in complexity to include shapes, then images of objects, then grayscale images of faces, then full color images of faces. The processor 232 of the server 130 may execute the genetic convolutional neural network application 236 over the training set provided by the researcher. After some measure (e.g., days) of computation time have passed, a set of a few hundred different small algorithms is generated and stored in the tool set database 234. The processor 232 of the server 130 may then use these algorithms in a convolutional neural network alongside existing standard tool sets and re-train/re-classify images, resulting in a higher overall level of accuracy. The produced facial recognition model can be stored in the tool set database 234 and distributed to any desired implementation for the researcher's facial recognition system. For example, the produced facial recognition model may be retrieved from the tool set database 234 of the server 130 and provided to the client 110 for analysis of a particular face, with the results of the facial recognition analysis being displayed on the output device 214. As another example, the image of the face to be analyzed may be provided by the client 110 to the server 130, wherein the facial recognition model may be retrieved from the tool set database 234 and run by the processor 232 of the server 130 and the results of the facial recognition analysis by the server 130 may be sent to the client 110.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
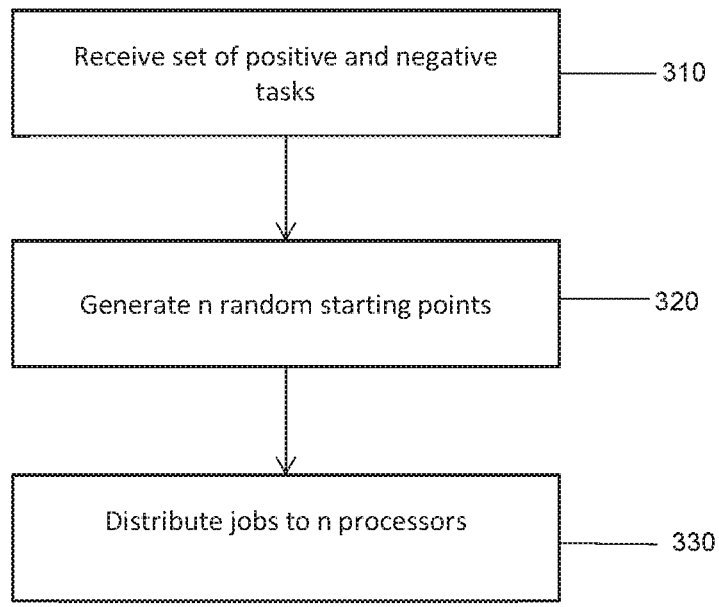
FIG. 3 is an example process associated with the disclosure of FIG. 2.
Figure 4:
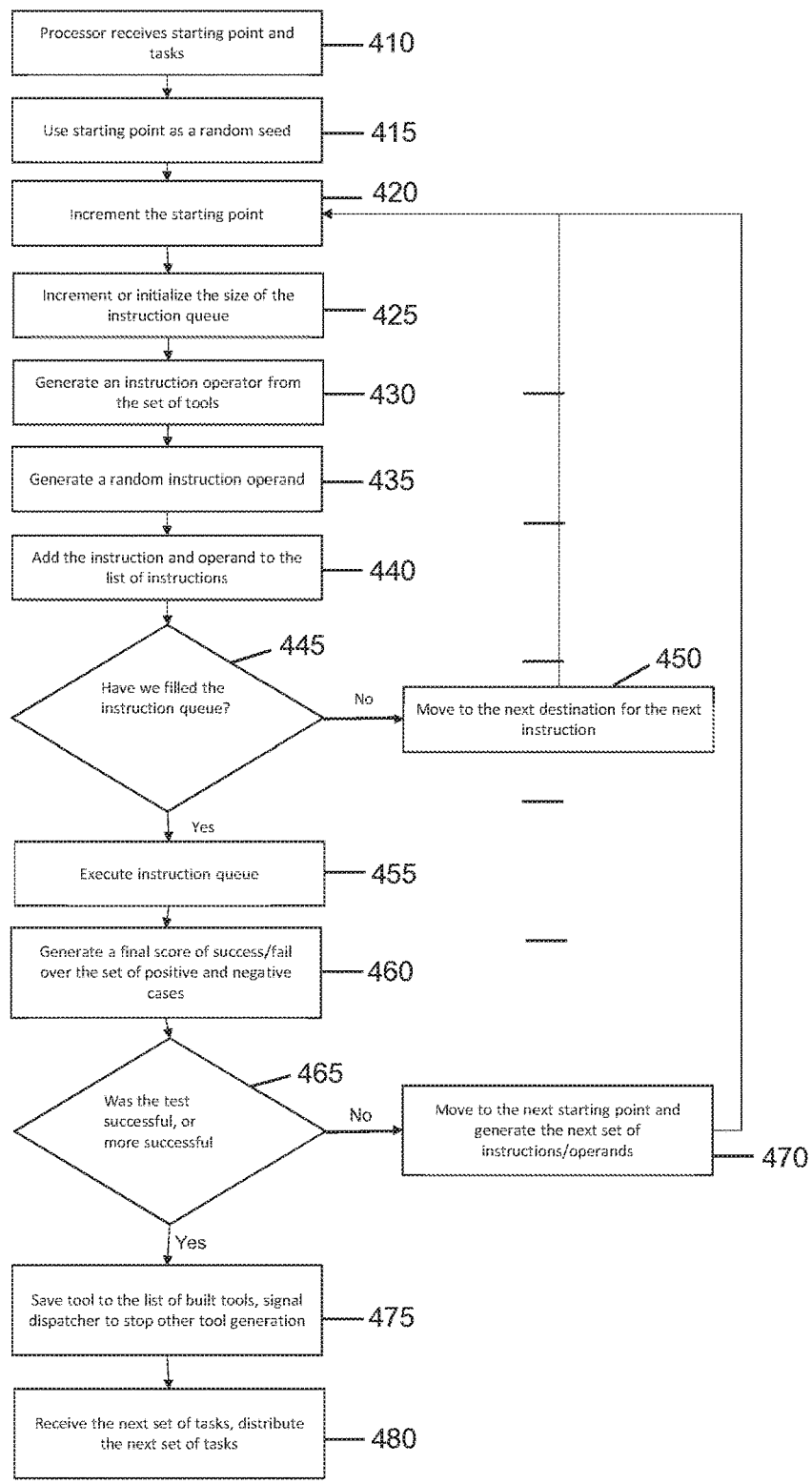
FIG. 4 is an example process associated with the disclosure of FIG. 2.
Figure 5:
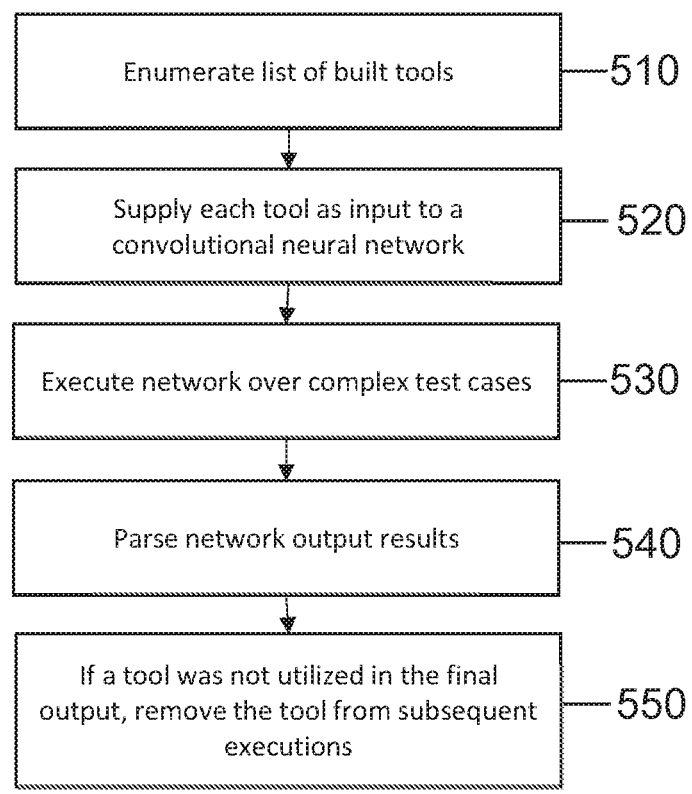
FIG. 5 is an example process associated with the disclosure of FIG. 2.

FIGS. 3-5 illustrate example processes 300, 400, 500 for generating genetic convolutional neural network tools using the example server 130 of FIG. 2. While FIGS. 3-5 are described with reference to FIG. 2, it should be noted that the process steps of FIGS. 3-5 may be performed by other systems.

As shown in FIG. 3, a process 300 initializes generating one or more tool sets by a genetic layer. The process 300 begins in step 310 by receiving a set of positive and negative tasks. In step 320, one or more random starting points are generated. For example, n starting points may be generated, where n is any whole number. The received positive and negative tasks (e.g., jobs) are distributed to one or more processors in step 330. For example, the jobs may be distributed to n processors in a single parallel processing machine, or to n processors in a multiple machine network.

FIG. 4 illustrates a process 400 for generating one or more tool sets by a genetic layer. In step 410 a processor receives a starting point and tasks. Thus, each of n processors receives its own starting point and set of tasks. The received starting point is then used as a random seed in step 415. In step 420 the starting point is incremented and in step 425 the size of the instruction queue is incremented or initialized. An instruction operator is generated from a set of tools in step 430 and a random instruction operand is generated in step 435. In step 440 the generated instruction and operand are added to a list of instructions.

After adding the instruction and operand to the list of instructions, it is determined whether the instruction queue is full in step 445. If the instruction queue is not full, the process 400 returns to step 420 and moves to the next destination for the next instruction in step 450. If the instruction queue is full, the instruction queue is executed in step 455. In step 460 a final score of success/fail over the set of positive and negative cases is generated. In step 465 it is determined whether the test was successful or more successful than a previous test. If the answer in step 465 is no, the process 400 returns to step 420, moving to the next starting point and generating the next set of instructions/operands in step 470. If the answer in step 465 is yes, the tool is saved to a list of built tools and a signal is sent to stop other tool generation in step 475. In step 480 the next set of tasks is received and distributed.

Process 500 shown in FIG. 5 utilizes the tools generated in process 400 to refine processing of a convolutional neural network. In step 510 a list of built tools is enumerated. Each tool is supplied as input to a convolutional neural network in step 520. In step 530 the convolutional neural network is executed over complex test cases. The convolutional neural network output results are then parsed in step 540. In step 550 the results are analyzed and if a particular tool was not utilized in the final output of the convolutional neural network, that particular tool is removed from subsequent executions of the same task by the network.

An example will now be described using the example processes 300-500 of FIGS. 3-5, a client 110 that is a smartphone and having an output device 214 that is a flat panel display, an input device 216 that is a touch screen interface, a content item database 224 that stores content that can be displayed on the smartphone, and a communications module 218 that provides for communication between the smartphone client 110 and a network 150 of servers 130, with at least one server 130 having a tool set database 234 and a genetic convolutional neural network application 236.

The process begins when the genetic convolutional neural network application 236 on a server 130 receives a set of positive and negative tasks, generates n random starting points and distributes jobs to n processors. Here, the genetic convolutional neural network application 236 may utilize parallel processors in server 130, processors of multiple servers 130 and/or clients 110 over network 150, or a combination of both. The genetic convolutional neural network application 236 then performs process 400 on the n processors to generate tools to add to a list of previously built tools. In one or more aspects, a newly generated tool may be different from any of the existing tools, thus providing an additional tool for use in complex analysis by a convolutional neural network. In one or more aspects, the newly generated tool may conform to or match one of the existing tools, thus confirming that the existing tool is the best tool based on the input parameters. The process ends when the genetic convolutional neural network application 236 applies the revised list of tools to a convolutional neural network, which in turn executes test cases of classifying complex data using the tools and then analyzes/parses the results. If a particular tool is not used in the output for a particular test case, the genetic convolutional neural network application 236 removes that tool from the tool set to be used for future executions of that test case.

Returning to the facial recognition example, a researcher may be looking to improve a particular facial recognition application that has been generated and tested by a conventional convolutional neural network based on input tools provided by human experts in the field of facial recognition and graphical processing. However, inherent human biases likely influence the tool sets that are used by the facial recognition algorithm in a conventional neural network. However, the researcher can employ the subject genetic layer by using the genetic convolutional neural network application 236 to generate and test improved tool sets that are free of any human bias errors. Further, the tool set may be continuously refined by the genetic layer using different or additional input data. The resulting tools generated by the genetic convolutional neural network application 236 deployed on one or more servers 130 are then used as inputs along with the existing set of tools to train an existing neural network, which then executes the new combined set of tools when it receives a facial image to analyze. For example, the researcher may send a facial image from a client 110 to the newly trained neural network and receive the output results from the genetically trained convolutional neural network to be displayed on the display 214 of the client 110. Here, the accuracy of the facial recognition and/or the speed by which the recognition is completed may be significantly improved by the organically developed tools of the genetic layer.

Thus, the subject technology specifically eliminates the need for human input based tools for use in a convolutional neural network. Further, the subject genetic layer utilizes huge brute force power (e.g., 10,000 times conventional convolutional neural network power) to generate tools free of human bias and that are organically evolved by the genetic convolutional neural network application 236 to provide vastly improved accuracy and/or efficiency of results from executing data analysis over the convolutional neural network. Accordingly, the subject technology is not achievable by human processing and is a completely new technology that does not exist in neural networks today.

The subject technology is thus a completely new layer for use in the convolutional neural network topology. For example, the conventional convolutional neural network structure may stay in place as is, with the new genetic layer being superimposed or added to the top of the convolutional neural network topology layout. Accordingly, the new top genetic layer provides initial improved tools/tool sets to the existing convolutional neural network and then continuously refines and improves the tools/tools sets from executions of data analysis over the convolutional neural network. The refinement may include revising the rank or weight associated with each tool and/or combination of tools (e.g., tool set). For example, in an initial set of tools for image analysis, a weighting may provide for attributing 10% attention to a curve in the upper left quadrant of the image and 20% attention to a straight line in the lower right quadrant of the image. Generation of a revised/new set of tools by the subject technology may then adjust the weighting to provide for attributing 15% attention to a curve in the upper left quadrant of the image and 15% attention to a straight line in the lower right quadrant of the image.

Hardware Overview

Figure 6:
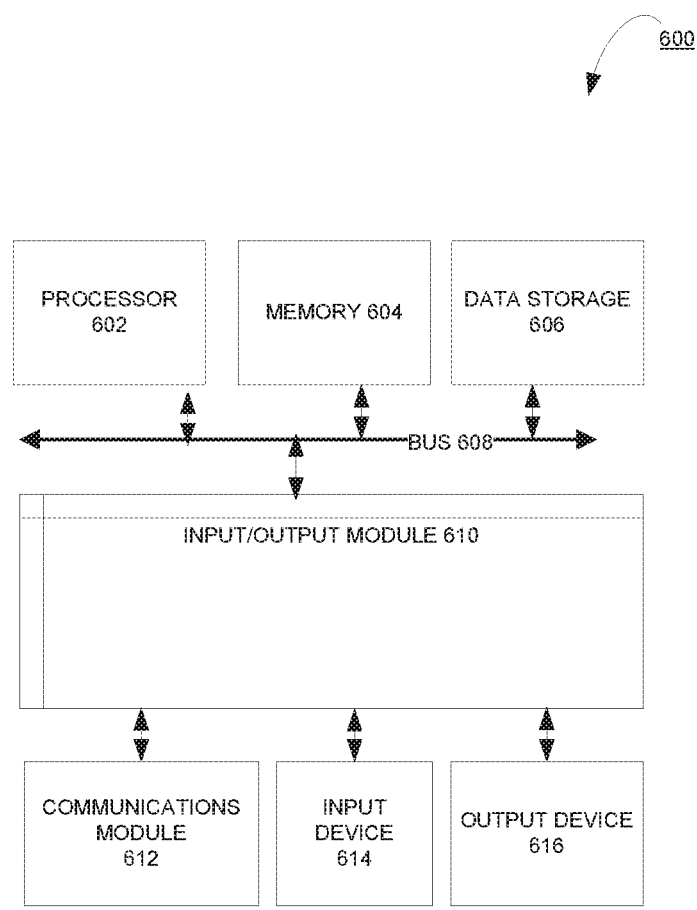
FIG. 6 is a block diagram illustrating an example computer system with which the clients and server of FIG. 2 can be implemented.

FIG. 6 is a block diagram illustrating an example computer system 600 with which the client 110 and server 130 of FIG. 2 can be implemented. In certain aspects, the computer system 600 may be implemented using hardware or a combination of software and hardware, either in a dedicated server or integrated into another entity or distributed across multiple entities.

Computer system 600 (e.g., client 110 or server 130) includes a bus 608 or other communication mechanism for communicating information, and a processor 602 (e.g., processor 212 and 236) coupled with bus 608 for processing information. According to one aspect, the computer system 600 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 600 may be implemented with one or more processors 602. Processor 602 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 220 and 230), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry. Expansion memory may also be provided and connected to computer system 600 through input/output module 610, which may include, for example, a SIMM (Single In Line Memory Module) card interface. Such expansion memory may provide extra storage space for computer system 600 or may also store applications or other information for computer system 600. Specifically, expansion memory may include instructions to carry out or supplement the processes described above and may include secure information also. Thus, for example, expansion memory may be provided as a security module for computer system 600 and may be programmed with instructions that permit secure use of computer system 600. In addition, secure applications may be provided via the SIMM cards, along with additional information, such as placing identifying information on the SIMM card in a non-hackable manner.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Example input/output modules 610 include data ports such as USB ports. In addition, input/output module 610 may be provided in communication with processor 602, so as to enable near area communication of computer system 600 with other devices. The input/output module 610 may provide, for example, for wired communication in some implementations, or for wireless communication in other implementations, and multiple interfaces may also be used. The input/output module 610 is configured to connect to a communications module 612. Example communications modules 612 (e.g., communications modules 218 and 238) include networking interface cards, such as Ethernet cards and modems.

The components of the system can be interconnected by any form or medium of digital data communication, e.g., a communication network. The communication network (e.g., network 150) can include, for example, any one or more of a PAN (Personal Area Network), a LAN (Local Area Network), a CAN (Controller Area Network), a MAN (Metropolitan Area Network), a WAN (Wide Area Network), a BBN (Broadband Network), the Internet, and the like. Further, the communication network can include, but is not limited to, for example, any one or more of the following network topologies, including a bus network, a star network, a ring network, a mesh network, a star-bus network, tree or hierarchical network, or the like.

For example, in certain aspects, communications module 612 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MIMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 612 sends and receives electrical, electromagnetic or optical signals that carry digital data streams representing various types of information. The network link typically provides data communication through one or more networks to other data devices. For example, the network link of the communications module 612 may provide a connection through local network to a host computer or to data equipment operated by an Internet Service Provider (ISP). The ISP in turn provides data communication services through the world wide packet data communication network now commonly referred to as the Internet. The local network and Internet both use electrical, electromagnetic or optical signals that carry digital data streams. The signals through the various networks and the signals on the network link and through communications module 612, which carry the digital data to and from computer system 600, are example forms of transmission media.

Computer system 600 can send messages and receive data, including program code, through the network(s), the network link and communications module 612. In the Internet example, a server might transmit a requested code for an application program through Internet, the ISP, the local network and communications module 612. The received code may be executed by processor 602 as it is received, and/or stored in data storage 606 for later execution.

In certain aspects, the input/output module 610 is configured to connect to a plurality of devices, such as an input device 614 (e.g., input device 216) and/or an output device 616 (e.g., output device 214). Example input devices 614 include a stylus, a finger, a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 616 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 616 may comprise appropriate circuitry for driving the output device 616 to present graphical and other information to a user.

According to one aspect of the present disclosure, the client 110 and server 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 602 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 608. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for genetic generation of a tool for a convolutional neural network, the method comprising:
   receiving a set of positive and negative tasks;
   generating a plurality of random starting points within the set of positive and negative tasks;
   distributing the received set of tasks and the generated plurality of random starting points to a plurality of processors;
   at each of the plurality of processors:
      using a received starting point as a random seed;
      incrementing the received starting point;
      initializing a size of an instruction queue;
      generating an instruction operator from a set of existing tools;
      generating a random instruction operand;
      adding the generated instruction operator and random instruction operand to a list of instructions;
      determining if the instruction queue has been filled;
      executing the instruction queue if the instruction queue has been filled;
      generating a score for an executed list of instructions in the instruction queue; and
      saving the executed list of instructions as a new tool if the generated score is determined to be acceptable.

2. The method of claim 1, further comprising:
   determining that the instruction queue has not been filled; and
   moving to a next destination for a next instruction by repeating the process from the point of incrementing the starting point.

3. The method of claim 1, wherein the generated score is a final score based on success and failure over the set of positive and negative tasks.

4. The method of claim 1, wherein the score is determined to be acceptable if a test defined by the executed list of instructions is successful.

5. The method of claim 1, wherein the score is determined to be acceptable if a test defined by the executed list of instructions is more successful than a previous test.

6. The method of claim 1, further comprising:
   determining that the score is not acceptable; and
   moving to a next starting point by repeating the process from the point of incrementing the starting point.

7. The method of claim 1, further comprising:
   signaling a dispatcher to stop other tool generation.

8. The method of claim 1, further comprising:
   receiving a next set of tasks; and
   distributing the next set of tasks.

9. The method of claim 1, further comprising:
   saving the new tool to the set of existing tools.

10. The method of claim 1, further comprising:
    saving the new tool to a list of built tools.

11. The method of claim 10, further comprising:
    enumerating the list of built tools.

12. The method of claim 11, further comprising:
    supplying each built tool from the enumerated list as input to a convolutional neural network; and
    executing the convolutional neural network over one or more test cases using the supplied built tools.

13. The method of claim 12, further comprising:
    parsing output results of the convolutional neural network execution.

14. The method of claim 13, further comprising:
    determining that a built tool from the enumerated list was not utilized in generating the output results; and
    removing the non-utilized built tool from subsequent executions by the convolutional neural network.

15. A system for genetic generation of a tool for a convolutional neural network, the system comprising:
    a memory; and
    a processor configured to execute instructions which, when executed, cause the processor to:
    receive a random starting point and a set of positive and negative tasks;
    use a first starting point as a random seed;
       increment the first starting point to obtain a second starting point;
       one of initialize and increment a size of an instruction queue;
       generate an instruction operator from a set of existing tools and a random instruction operand;
       add the generated instruction operator and random instruction operand to a list of instructions;
       execute the instruction queue if the instruction queue has been filled;
       generate a score for an executed list of instructions in the instruction queue, wherein the generated score is a final score based on success and failure over the set of positive and negative tasks;
    save the executed list of instructions as a new built tool if the score is determined to indicate one of a successful test and a test more successful than a previous test;
    save the new built tool to a set of previously built tools to create a list of built tools;
    enumerate the list of built tools; and
    supply each built tool from the enumerated list as input to a convolutional neural network.

16. The system of claim 15, further comprising instructions that cause the processor to:
    determine one of the instruction queue has not been filled and the score does not indicate one of a successful test and a test more successful than a previous test;

increment the second starting point; and repeat the instructions executed by the processor at the step of one of initialize and increment the size of the instruction queue.

17. The system of claim 15, further comprising instructions that cause the processor to:

execute the convolutional neural network over one or more test cases based on the supplied built tools;

parse output results of the convolutional neural network execution;

remove, from the list of built tools, one or more of the built tools not utilized by the convolutional neural network to generate the output results; and save one or more remaining built tools as a new list of built tools.

18. A non-transitory machine-readable storage medium comprising machine-readable instructions for causing a processor to execute a method for genetic generation of a tool set for a convolutional neural network, the method comprising:

receiving a set of positive and negative tasks;

generating a plurality of random starting points;

distributing the received tasks and the generated starting points to a plurality of processors;

using a received starting point as a random seed;

incrementing the received starting point;

initializing a size of an instruction queue;

generating an instruction operator from a set of existing tools;

generating a random instruction operand;

adding the generated instruction operator and random instruction operand to a list of instructions;

determining if the instruction queue has been filled;

executing the instruction queue if the instruction queue has been filled;

generating a score for an executed list of instructions in the instruction queue, wherein the generated score is determined to be acceptable if a test defined by the executed list of instructions is more successful than a previous test; and saving the executed list of instructions as a new tool if the score exceeds a success threshold.

19. The non-transitory machine-readable storage medium of claim 18, wherein the method executed by the processor further comprises:

determining that either the instruction queue has not been filled or the score does not indicate one of a successful test and a test more successful than a previous test;

incrementing the previous starting point;

incrementing the initialized size of the instruction queue; and repeating the process beginning at the step of generating an instruction operator from the set of existing tools.

20. The non-transitory machine-readable storage medium of claim 18, wherein the method executed by the processor further comprises:

saving the new tool to a set of previously built tools to create a new set of tools;

enumerating the new set of tools;

providing the new set of tools as inputs to a convolutional neural network;

executing the convolutional neural network over one or more test cases based on the new set of tools;

parsing output results of the convolutional neural network execution;

removing, from the new set of tools, all tools not utilized to generate the output results; and saving the tools not removed from the new set of tools as a revised set of tools.

* * * * *